(12) United States Patent
Tseng

(10) Patent No.: US 10,764,090 B2
(45) Date of Patent: Sep. 1, 2020

(54) MORSE CODE INPUT METHOD AND PORTABLE ELECTRONIC DEVICE FOR PERFORMING SAME

(71) Applicant: GETAC TECHNOLOGY CORPORATION, Hsinchu County (TW)

(72) Inventor: Kuo-Yang Tseng, Taipei (TW)

(73) Assignee: GETAC TECHNOLOGY CORPORATION, Hsinchu County (TW)

( * ) Notice: Subject to any disclaimer, the term of this patent is extended or adjusted under 35 U.S.C. 154(b) by 66 days.

(21) Appl. No.: 16/148,200

(22) Filed: Oct. 1, 2018

(65) Prior Publication Data

US 2020/0106643 A1  Apr. 2, 2020

(51) Int. Cl.
*G06F 3/041* (2006.01)
*H04L 15/04* (2006.01)

(52) U.S. Cl.
CPC ............ *H04L 15/04* (2013.01); *G06F 3/0416* (2013.01)

(58) Field of Classification Search
CPC ............................... G06F 3/0416; H04L 15/04
See application file for complete search history.

(56) References Cited

U.S. PATENT DOCUMENTS

| 2002/0165013 A1* | 11/2002 | Bright | G06F 3/016 455/567 |
| 2008/0258941 A1* | 10/2008 | Oh | G06F 3/018 341/22 |
| 2010/0026628 A1* | 2/2010 | Liu | G06F 3/0233 345/168 |
| 2013/0063392 A1* | 3/2013 | Lo | G06F 3/044 345/174 |
| 2014/0189604 A1* | 7/2014 | Garrison | G06F 3/0488 715/863 |
| 2015/0015493 A1* | 1/2015 | Hsieh | G06F 3/0488 345/173 |
| 2016/0054801 A1* | 2/2016 | Liu | H04L 15/00 345/156 |
| 2016/0132115 A1* | 5/2016 | Haga | G06F 3/0412 345/173 |

* cited by examiner

Primary Examiner — Benyam Ketema

(57) ABSTRACT

A Morse code input method and a portable electronic device for performing the method are provided. The portable electronic device includes a processing circuit and a touchscreen. The method includes: sensing touch events by the touchscreen, recording and comparing time periods of the touch events by the processing circuit; identifying, by the processing circuit, inputs in the ith touch event through (k−1)th touch event as short signals when the time period of the kth touch event is greater than or equal to N times the time period of (k−1)th touch event and the kth touch event is not the last touch event, wherein N is a positive number, k and i are positive integers, with k being greater than or equal to i, and the ith touch event is the earliest one of the touch events in which inputs have not yet been identified as long or short signals.

10 Claims, 2 Drawing Sheets

MORSE CODE INPUT METHOD AND PORTABLE ELECTRONIC DEVICE FOR PERFORMING SAME

BACKGROUND OF THE INVENTION

Field of the Invention

The present disclosure relates to Morse code input methods and portable electronic devices for performing the same and, more particularly, to a Morse code input method which entails determining whether inputs are short signals or long signals according to time periods of touches to a touchscreen, and a portable electronic device for performing the Morse code input method.

Description of the Prior Art

Commercially-available techniques of outputting Morse code are achieved by flashes, sounds, vibrations, etc. By contrast, techniques of inputting Morse code usually require users to use a keyboard to enter alphabets, numerals and symbols, all of which Morse code represents. The aforesaid prior art, however, requires the users in an emergency to look at a keyboard and a screen of a portable electronic device while inputting Morse code with the portable electronic device secretly. As a result, the aforesaid prior art still has room for improvement in terms of confidentiality and ease of use.

Some related conventional techniques entail determining whether an input is a short signal or a long signal according to time periods of presses of keyboard keys. With the techniques, an input is identified as a short signal when the press of a keyboard key lasts 0.08 second to 0.12 second, whereas an input is identified as a long signal when the press of a keyboard key lasts 0.28 second to 0.32 second. However, in an emergency, it is difficult for the users to time a press. As a result, the techniques fail to render any operation intuitive or easy.

SUMMARY OF THE INVENTION

In view of the aforesaid drawbacks of the prior art, it is an objective of the present disclosure to provide a Morse code input method which entails determining whether inputs are short signals or long signals according to time periods of touches to a touchscreen, and provide a portable electronic device for performing the Morse code input method.

In order to achieve the above and other objectives, the present disclosure provides, in an embodiment thereof, a Morse code input method performed on a portable electronic device. The portable electronic device comprises a processing circuit and a touchscreen. The Morse code input method comprises the steps of: sensing a plurality of touch events consecutively by the touchscreen, followed by recording and comparing time periods of the touch events by the processing circuit; identifying, by the processing circuit, each input in the ith touch event through the (k−1)th touch event as a short signal when the time period of the kth touch event is greater than or equal to N times the time period of (k−1)th touch event and the kth touch event is not the last one of the touch events; and identifying, by the processing circuit, each input in the ith touch event through the (k−1)th touch event as a long signal when the time period of the kth touch event is less than or equal to M times the time period of the (k−1)th touch event and the kth touch event is not the last one of the touch events, wherein N and M are positive numbers, whereas k and i are positive integers, where k is greater than or equal to i, and the ith touch event is the earliest one of the touch events in which inputs have not yet been identified as long signals or short signals. The present disclosure, in another embodiment thereof, further provides a portable electronic device. The portable electronic device comprises a processing circuit, a touchscreen and a storage device. The storage device stores an application adapted to instruct the portable electronic device to perform the Morse code input method in the preceding embodiment.

Features and technical solutions of the present disclosure are illustrated by accompanying drawings and described below. However, the accompanying drawings and description are illustrative of the present disclosure rather than restrictive of the claims of the present disclosure.

DETAILED DESCRIPTION OF THE EMBODIMENTS

Figure 1:
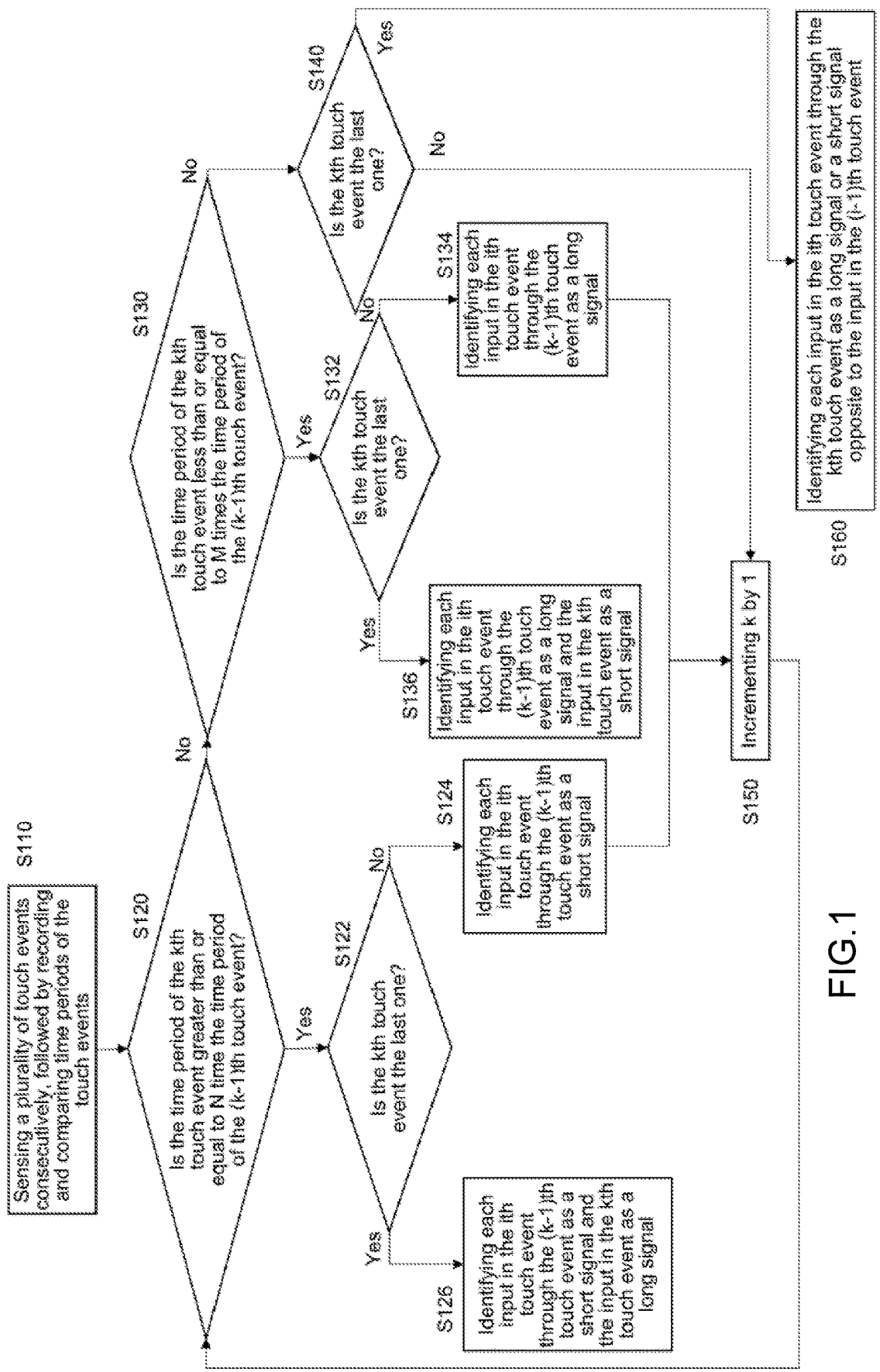
FIG. 1 is a flowchart of a Morse code input method according to an embodiment of the present disclosure.

The present disclosure is illustrated by embodiments and depicted by drawings. However, technical concepts of the present disclosure can be expressed in various ways and must not be interpreted in such a manner to be restricted to illustrative embodiments presented below. Like reference numerals used in the drawings indicate like components.

Figure 2:
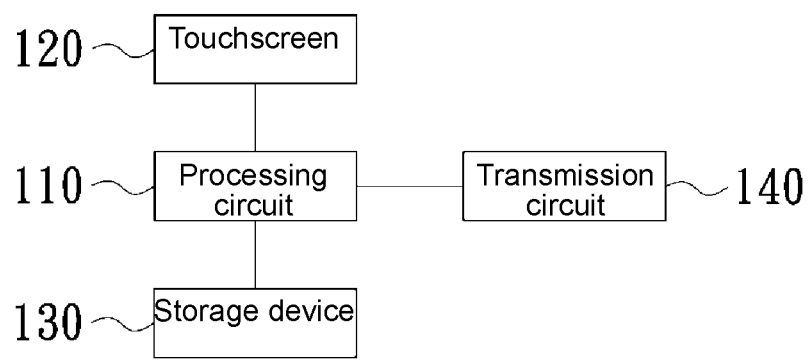
FIG. 2 is a function block diagram of a portable electronic device according to another embodiment of the present disclosure.

Please refer to FIG. 1 and FIG. 2. FIG. 1 is a flowchart of a Morse code input method according to an embodiment of the present disclosure. FIG. 2 is a function block diagram of a portable electronic device 10 according to an embodiment of the present disclosure. The Morse code input method shown in FIG. 1 is performed on the portable electronic device 10 in FIG. 2, but the present disclosure is not limited thereto. Persons skilled in the art can design the portable electronic device 10 as needed. Referring to FIG. 2, the portable electronic device 10 essentially comprises a processing circuit 110 and a touchscreen 120. The processing circuit 110 and the touchscreen 120 is implemented as a physical circuit or as a combination of a physical circuit and software, but the present disclosure is not restrictive of the implementation of the processing circuit 110 and the touchscreen 120. The processing circuit 110 and the touchscreen 120 are either integrated or separate, but the present disclosure is not limited thereto.

According to the prior art, the Morse code input method shown in FIG. 1 is implemented by an application (not shown) which has a plurality of commands. The application is stored in a storage device 130 and adapted to instruct the portable electronic device 10 to perform the Morse code input method shown in FIG. 1. After the application has been installed on the portable electronic device 10, the portable electronic device 10 can start the Morse code input method shown in FIG. 1. The present disclosure is not restrictive of the application installed on the portable electronic device 10 and specific ways of starting and performing the Morse code input method shown in FIG. 1; in this regard, persons skilled in the art can undertake related design as needed. The storage device 130 is either integrated into the portable electronic device 10 as shown in FIG. 2 or separate from the portable electronic device 10, but the present disclosure is not restrictive of the implementation of the storage device 130.

After the portable electronic device 10 has started to perform the Morse code input method shown in FIG. 1, the process flow of the method begins and follows the steps described below. In step S110, this embodiment entails sensing a plurality of touch events (i.e., touches to the touchscreen 120) consecutively by the touchscreen 120, followed by recording and comparing time periods of the touch events (i.e., time periods of touches to the touchscreen 120) by the processing circuit 110. For the sake of illustration, this embodiment is exemplified by nine touch events, but the present disclosure is not limited thereto. For instance, the first touch event is denoted by EN (1), the time period of the first touch event EN (1) by CT (1), the second touch event by EN (2), and the time period of the second touch event EN (2) by CT (2). By analogy, the ninth touch event is denoted by EN (9), and the time period of the ninth touch event EN (9) by CT (9). The present disclosure is not restrictive of any specific way of identifying the ninth touch event EN (9) as the last touch event by the processing circuit 110; in this regard, persons skilled in the art can undertake related design as needed.

Afterward, in step S120, this embodiment entails determining whether the time period CT (k) of the kth touch event EN (k) is greater than or equal to N times the time period CT (k−1) of the (k−1)th touch event EN (k−1) (i.e., time period CT (k)≥N* time period CT (k−1)). If the determination is affirmative, the method goes to step S122. If the determination is negative, the method goes to step S130. In step S122, this embodiment entails determining whether the kth touch event EN (k) is the last one of the touch events EN (1)~EN (9) (i.e., the last touch event EN (9)). If the determination is negative, the method goes to step S124 and step S150. If the determination is affirmative, the method goes to step S126. In step S124, this embodiment entails identifying by the processing circuit 110 each input in the ith touch event EN (i) through the (k−1)th touch event EN (k−1) as a short signal called "dot" (•) or "dit". In step 150, this embodiment entails incrementing k by 1 before going back to step S120.

Similarly, in step S130, this embodiment entails determining whether the time period CT (k) of the kth touch event EN (k) is less than or equal to M times the time period CT (k−1) of the (k−1)th touch event EN (k−1) (i.e., time period CT (k)≤M* time period CT (k−1)). If the determination is affirmative, the method goes to step S132. If the determination is negative, the method goes to step S140. In step S132, this embodiment entails determining whether the kth touch event EN (k) is the last one of the first through ninth touch events EN (1)~EN (9). If the determination is negative, the method goes to step S134 and step S150. If the determination is affirmative, the method goes to step S136. In step S134, this embodiment entails identifying by the processing circuit 110 each input in the ith touch event EN (i) through the (k−1)th touch event EN (k−1) as a long signal called "dash" (-) or "dah".

In step S140, this embodiment entails determining whether the kth touch event EN (k) is the last one of the first through ninth touch events EN (1)~EN (9). If the determination is negative, the method goes to step S150. If the determination is affirmative, the method goes to step S160. In step S160, this embodiment entails identifying by the processing circuit 110 each input in the ith touch event EN (i) through the kth touch event EN (k) as a long signal or a short signal, which is opposite to the input in the (i−1)th touch event EN (i−1). In this embodiment, N and M are positive numbers, whereas k and i are positive integers less than or equal to the total number of the touch events, where k is greater than or equal to i, and the ith touch event EN (i) is the earliest one of the first through ninth touch events EN (1)~EN (9) in which inputs have not yet been identified as long signals or short signals.

For the sake of illustration, this embodiment is exemplified by N=2 and M=0.5, but the present disclosure is not limited thereto. For instance, in this embodiment, assuming users want to input Morse code · · ---- · ·, the first through third touch events EN (1)~EN (3) take only the short time periods CT (1)~CT (3) to input the first three short signals, respectively. For instance, the time periods CT (1)~CT (3) of the first through third touch events EN (1)~EN (3) are 1 second each. Therefore, given k=1~3, that is, the first through third touch events EN (1)~EN (3), this embodiment entails executing a loop of step S120, step S130, step S140 and step S150 continuously. Afterward, the fourth touch event EN (4) takes the long time period CT (4) to input the first long signal. For instance, the time period CT (4) of the fourth touch event EN (4) is 2 seconds. Therefore, given k=4, when the time period CT (4) of the fourth touch event EN (4) is greater than or equal to 2 times the time period CT (3) of the third touch event EN (3), and the fourth touch event EN (4) is not the last one of the first through ninth touch events EN (1)~EN (9), this embodiment entails identifying by the processing circuit 110 each input in the first touch event EN (1) through the third touch event EN (3) as a short signal and then incrementing k by 1 before going back to step S120.

The fifth and sixth touch events EN (5), EN (6) also take the long time periods CT (5), CT (6) to input the second and third long signals, respectively. For instance, both the time periods CT (5), CT (6) of the fifth and sixth touch events EN (5), EN (6) are 2 seconds. Hence, given k=5 and k=6, that is, the fifth and sixth touch events EN (5), EN (6), this embodiment entails executing a loop of step S120, step S130, step S140 and step S150 continuously. Afterward, the seventh touch event EN (7) takes the short time period CT (7) to input the first short signal. For instance, the time period CT (7) of the seventh touch event EN (7) is 1 second. Hence, given k=7, when the time period CT (7) of the seventh touch event EN (7) is less than or equal to 0.5 time the time period CT (6) of the sixth touch event EN (6), and the seventh touch event EN (7) is not the last one of the first through ninth touch events EN (1)~EN (9), this embodiment entails identifying by the processing circuit 110 each input in the fourth touch event EN (4) through the sixth touch event EN (6) as a long signal and incrementing k by 1 before going back to step S120.

Similarly, the eighth and ninth touch events EN (8), EN (9) take the short time periods CT (8), CT (9) to input the second and third short signals, respectively. For instance, both the time periods CT (8), CT (9) of the eighth and ninth touch events EN (8), EN (9) are 1 second, hence, given k=8, that is, the eighth touch event EN (8), this embodiment entails executing a loop of step S120, step S130, step S140 and step S150 continuously. However, given k=9, when the ninth touch event EN (9) is the last one of the first through ninth touch events EN (1)~EN (9), this embodiment entails identifying by the processing circuit 110 each input in the seventh touch event EN (7) through the ninth touch event EN (9) as a short signal opposite to the input in the sixth touch event EN (6).

Referring to FIG. 1, in step S126, this embodiment entails identifying by the processing circuit 110 each input in the ith touch event EN (i) through the (k−1)th touch event EN (k−1) as a short signal and the input in the kth touch event EN (k) as a long signal. For instance, in this embodiment, assuming the users want to input Morse code ·· ----·· , the ninth touch event EN (9) takes the long time period CT (9) to input the last long signal. For instance, the time period CT (9) of the ninth touch event EN (9) is 2 seconds, Hence, given k=9, when the time period CT (9) of the ninth touch event EN (9) is greater than or equal to 2 times the time period CT (8) of the eighth touch event EN (8), and the ninth touch event EN (9) is the last one of the first through ninth touch events EN (1)~EN (9), this embodiment entails identifying by the processing circuit 110 each input in the seventh touch event EN (7) through the eighth touch event EN (8) as a short signal and the input in the ninth touch event EN (9) as a long signal.

Similarly, as shown in FIG. 1, in step S136, this embodiment entails identifying by the processing circuit 110 each input in the ith touch event EN (i) through the (k−1)th touch event EN (k−1) as a long signal and the input in the kth touch event EN (k) as a short signal. For instance, in this embodiment, assuming the users want to input Morse code ·· ------ , the fifth through eighth touch events EN (5)~EN (8) take the long time periods CT (5)~CT (8) to input long signals, respectively. For instance, like the time period CT (4) of the fourth touch event EN (4), the time periods CT (5)~CT (8) of the fifth through eighth touch events EN (5)~EN (8) are 2 seconds each. Hence, given k=5~8, that is, the fifth through eighth touch events EN (5)~EN (8), this embodiment entails executing a loop of step S120, step S130, step S140 and step S150 continuously. Afterward, the ninth touch event EN (9) takes the short time period CT (9) to input the last short signal. For instance, the time period CT (9) of the ninth touch event EN (9) is 1 second. Hence, given k=9, when the time period CT (9) of the ninth touch event EN (9) is less than or equal to 0.5 time the time period CT (8) of the eighth touch event EN (8), and the ninth touch event EN (9) is the last one of the first through ninth touch events EN (1)~EN (9), this embodiment entails identifying by the processing circuit 110 each input in the fourth touch event EN (4) through the eighth touch event EN (8) as a long signal and the input in the ninth touch event EN (9) as a short signal. Related details are the same as previous counterparts and thus, for the sake of brevity, are not described again.

The order of the step S120, step S122, step S124, step S126 and step S130, step S132, step S134 and step S136 shown in FIG. 1 is illustrative rather than restrictive of the present disclosure. In another embodiment, the processing circuit 110 does not necessarily perform the step S120, step S122, step S124, step S126 and step S130, step S132, step S134, step S136 in sequence; nonetheless, implementation of the present disclosure remains unaffected. As indicated by the aforesaid disclosure, persons skilled in the art understand that this embodiment enables the processing circuit 110 to determine whether inputs are short signals or long signals according to time periods of touches to the touchscreen 120. Therefore, compared with the prior art, this embodiment is effective in rendering any operation intuitive or easy.

Referring to FIG. 2, the portable electronic device 10 further comprises a transmission circuit 140. The transmission circuit 140 is implemented as a physical circuit or as a combination of a physical circuit and firmware/software, but the present disclosure is not limited thereto. The transmission circuit 140 is either integrated into the portable electronic device 10 as shown in FIG. 2 or separate from the portable electronic device 10, but the present disclosure is not limited thereto. Referring to FIG. 1, the Morse code input method further comprises transmitting, by the transmission circuit 140 and in a wireless manner, a long signal or a short signal consecutively identified as an input to a remote host (not shown) and/or a cloud server (not shown). The remote host and/or cloud server receives through the transmission circuit 140 the entire Morse code which the users enter into the portable electronic device 10.

For instance, assuming the Morse code is ·· ----·· , according to international Morse code protocols, the Morse code corresponding to character "S" is ···, whereas the Morse code corresponding to character "O" is - - - . Hence, after the remote host and/or cloud server has received the Morse code in its entirety, the remote host and/or cloud server decodes the Morse code in its entirety to obtain corresponding characters, i.e., SOS, by look-up and smart word selection. The present disclosure is not restrictive of any specific way which the remote host and/or cloud server decodes the entire Morse code; in this regard, persons skilled in the art can undertake related design as needed. In another embodiment, the aforesaid decoding process is performed by the processing circuit 110 of the portable electronic device 10, and the transmission circuit 140 transmits the result of the aforesaid decoding process to the remote host and/or cloud server; nonetheless, implementation of the present disclosure remains unaffected.

To render the aforesaid decoding process more precise, in step S110, this embodiment further entails recording and comparing, by the processing circuit 110, time intervals of touch events, followed by identifying and recording, by the processing circuit 110, the (k−1)th touch event EN (k−1) as a character interruption node when a time interval between the (k−1)th touch event EN (k−1) and the kth touch event EN (k) is greater than or equal to a predetermined threshold. For instance, given the predetermined threshold of 0.5 second and the entire Morse code of ·· ----·· , when a time interval between the third touch event EN (3) and the fourth touch event EN (4) is greater than or equal to 0.5 second, this embodiment entails identifying and recording, by the processing circuit 110, the third touch event EN (3) as a character interruption node. Therefore, the first three short signals input in the first through third touch events EN (1)~EN (3) must be collectively decoded to obtain the first character "S".

Similarly, when a time interval between the sixth touch event EN (6) and the seventh touch event EN (7) is greater than or equal to 0.5 second, this embodiment entails identifying and recording, by the processing circuit 110, the sixth touch event EN (6) as another character interruption node. Therefore, the intermediate three long signals input in the fourth through sixth touch events EN (4)~EN (6) must be collectively decoded to obtain the second character "O". The last three short signals input in the seventh through ninth touch events EN (7)~EN (9) must be collectively decoded to obtain the third character "S". Related details are the same as previous counterparts and thus, for the sake of brevity, are not described again.

In conclusion, the present disclosure in an embodiment thereof provides a Morse code input method and a portable electronic device for performing the same to enable a processing circuit to determine whether inputs are short signals or long signals according to time periods of touches to a touchscreen. Therefore, compared with the prior art, the present disclosure is effective in rendering any operation intuitive or easy.

The present disclosure is illustrated by embodiments above. However, the embodiments are not restrictive of the claims of the present disclosure.

What is claimed is:

1. A Morse code input method, performed on a portable electronic device, the portable electronic device comprising a processing circuit and a touchscreen, the Morse code input method comprising the steps of:
   sensing a plurality of touch events consecutively by the touchscreen;
   recording time periods of the touch events by the processing circuit;
   performing in sequence an identification process for each of the touch events beginning with the second touch event, wherein the identification process comprises:
      identifying, by the processing circuit, each input in the ith touch event through the (k−1)th touch event as a short signal when the time period of the kth touch event is greater than or equal to N times the time period of (k−1)th touch event and the kth touch event is not the last one of the touch events; and
      identifying, by the processing circuit, each input in the ith touch event through the (k−1)th touch event as a long signal when the time period of the kth touch event is less than or equal to M times the time period of the (k−1)th touch event and the kth touch event is not the last one of the touch events; and
   wherein N and M are positive numbers, k and i are positive integers, k is greater than or equal to i, k is the number of the touch event in the sequence, and the ith touch event is the earliest one of the touch events in which inputs have not previously been identified as long signals or short signals at the time the identifying steps are performed.

2. The Morse code input method of claim 1, wherein the identification process further comprises:
   identifying, by the processing circuit, each input in the ith touch event through the (k−1)th touch event as the short signal and the input in the kth touch event as the long signal when the time period of the kth touch event is greater than or equal to N times the time period of the (k−1)th touch event and the kth touch event is the last one of the touch events and
   identifying, by the processing circuit, each input in the ith touch event through the (k−1)th touch event as the long signal and the input in the kth touch event as the short signal when the time period of the kth touch event is less than or equal to M times the time period of the (k−1)th touch event and the kth touch event is the last one of the touch events.

3. The Morse code input method of claim 2, wherein the identification process further comprises:
   identifying, by the processing circuit, each input in the ith touch event through the kth touch event as the long signal or the short signal opposite to the input in the (i−1)th touch event when the time period of the kth touch event is neither greater than or equal to N times the time period of the (k−1)th touch event nor less than or equal to M time the time period of the (k−1)th touch event and the kth touch event is the last one of the touch events.

4. The Morse code input method of claim 3, wherein the portable electronic device comprises a transmission circuit, and the Morse code input method further comprises the step of transmitting, by the transmission circuit and in a wireless manner, the long signal or the short signal consecutively identified as the input to a remote host and/or a cloud server.

5. The Morse code input method of claim 3, wherein the step of recording and comparing the time periods of the touch events by the processing circuit further comprises recording and comparing, by the processing circuit, time intervals between the touch events, and identifying and recording, by the processing circuit, the (k−1)th touch event as a character interruption node when the time interval between the (k−1)th touch event and the kth touch event is greater than or equal to a predetermined threshold.

6. A portable electronic device, comprising:
   a processing circuit;
   a touchscreen; and
   a storage device for storing an application adapted to instruct the portable electronic device to perform a Morse code input method, wherein the Morse code input method comprises the steps of:
   sensing a plurality of touch events consecutively by the touchscreen;
   recording time periods of the touch events by the processing circuit;
   performing in sequence an identification process for each of the touch events beginning with the second touch event, wherein the identification process comprises:
      identifying, by the processing circuit, each input in the ith touch event through the (k−1)th touch event as a short signal when the time period of the kth touch event is greater than or equal to N times the time period of (k−1)th touch event and the kth touch event is not the last one of the touch events; and
      identifying, by the processing circuit, each input in the ith touch event through the (k−1)th touch event as a long signal when the time period of the kth touch event is less than or equal to M times the time period of the (k−1)th touch event and the kth touch event is not the last one of the touch events;
   wherein N and M are natural numbers, k and i are positive integers, k is greater than or equal to i, k is the number of the touch event in the sequence, and the ith touch event is the earliest one of the touch events in which inputs have not previously been identified as long signals or short signals at the time the identifying steps are performed.

7. The portable electronic device of claim 6, wherein the identification process further comprises:
   identifying, by the processing circuit, each input in the ith touch event through the (k−1)th touch event as the short signal and the input in the kth touch event as the long signal when the time period of the kth touch event is greater than or equal to N times the time period of the (k−1)th touch event and the kth touch event is the last one of the touch events; and
   identifying, by the processing circuit, each input in the ith touch event through the (k−1)th touch event as the long signal and the input in the kth touch event as the short signal when the time period of the kth touch event is less than or equal to M times the time period of the (k−1)th touch event and the kth touch event is the last one of the touch events.

8. The portable electronic device of claim 7, wherein the identification process further comprises:
   identifying, by the processing circuit, each input in the ith touch event through the kth touch event as the long signal or the short signal opposite to the input in the (i−1)th touch event when the time period of the kth touch event is neither greater than or equal to N times the time period of the (k−1)th touch event nor less than or equal to M times the time period of the (k−1)th touch event and the kth touch event is the last one of the touch events.

9. The portable electronic device of claim 7, further comprising a transmission circuit, wherein the Morse code input method further comprises the step of transmitting, by the transmission circuit and in a wireless manner, the long signal or the short signal consecutively identified as the input to a remote host and/or a cloud server.

10. The portable electronic device of claim 7, wherein the step of recording and comparing the time periods of the touch events by the processing circuit further comprises recording and comparing, by the processing circuit, time intervals between the touch events, and identifying and recording, by the processing circuit, the (k−1)th touch event as a character interruption node when the time interval between the (k−1)th touch event and the kth touch event is greater than or equal to a predetermined threshold.

* * * * *